(12) United States Patent
Derocher et al.

(10) Patent No.: US 7,120,667 B2
(45) Date of Patent: Oct. 10, 2006

(54) METHOD AND SYSTEM FOR AD HOC NETWORKING OF COMPUTER USERS

(75) Inventors: Michael D Derocher, Corvallis, OR (US); David R Kline, Corvallis, OR (US); Craig D Boyle, San Jose, CA (US); Mitko G Mitev, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 985 days.

(21) Appl. No.: 10/021,190

(22) Filed: Oct. 30, 2001

(65) Prior Publication Data

US 2003/0097449 A1    May 22, 2003

(51) Int. Cl.
*G06F 15/16* (2006.01)
(52) U.S. Cl. .............. 709/204; 709/227; 709/229; 713/150
(58) Field of Classification Search ............. 709/204, 709/226, 227, 229; 713/150; 715/771; 370/338
See application file for complete search history.

(56) References Cited

U.S. PATENT DOCUMENTS

| 6,240,080 B1 | 5/2001 | Okanoue et al. ............ 370/338 |
| 2001/0003191 A1* | 6/2001 | Kovacs et al. .............. 709/226 |
| 2002/0032853 A1* | 3/2002 | Preston et al. .............. 713/151 |
| 2002/0132605 A1* | 9/2002 | Smeets et al. .............. 455/411 |
| 2003/0025735 A1* | 2/2003 | Polgar et al. ............... 345/771 |

FOREIGN PATENT DOCUMENTS

| JP | 10289047 | 10/1998 |
| JP | 2000224156 | 8/2000 |
| JP | 2000305885 | 11/2000 |
| JP | 2001184288 | 7/2001 |
| JP | 2001222498 | 8/2001 |
| JP | 2001222507 | 8/2001 |
| WO | WO 00/22860 | 4/2000 |
| WO | WO 01/74011 | 10/2001 |
| WO | WO01/74011 | * 10/2001 |

OTHER PUBLICATIONS

Kenichi Mase, Ad Hoc Network, Journal of Institute of Electronics, Information and Communication . . . Feb. 1, 2001; vol. 84 No. 2; pp. 127-134.

* cited by examiner

*Primary Examiner*—Frantz B. Jean
(74) *Attorney, Agent, or Firm*—Jeff D. Limon

(57) ABSTRACT

A computer that establishes an ad hoc network, and a method performed by the computer are disclosed. The computer comprises an input device such as a keyboard or a graphical pointing device having a selector that generates a signal which indicates that a user has selected an ad hoc networking function. In one embodiment the computer includes a processor, coupled to the input device, which receives the signal and causes the computer to participate in an ad hoc network. The computer can also include a network interface, coupled to the processor, for communicating directly with at least one other computer within wireless communications range of the first computer.

46 Claims, 12 Drawing Sheets

310 →

Ad Hoc - New Meeting

Meeting Name:

Meeting Type:  [ Local ]  [ Local Area ]  [ Wide Area ]

Security Level: [ None ]  [ Low ]  [ High ]

Password:

Ad Hoc Admissions Page

Meeting Name: June Review

| User Name | Allow | |
|---|---|---|
| Memphis | [Yes] | [No] |
| Craig | [Yes] | [No] |
| ⋮ | | |

Fig. 5

METHOD AND SYSTEM FOR AD HOC NETWORKING OF COMPUTER USERS

BACKGROUND OF THE INVENTION

The invention relates generally to the field of computers and, more particularly, to methods and equipment used to communicate among computers.

In modern office environments, individual personal computers are often linked to computer communications networks. These networks allow communications among computers within the office environment as well as with other computers connected to other networks accessible by way of the worldwide telecommunications infrastructure. Thus, given such network connectivity, a computer user can send and receive messages to and from virtually any other networked computer located anywhere in the world.

However, although advances in computer hardware, software, and telecommunications infrastructure have contributed to substantial increases in worker productivity, computer users today demand devices that embody both capability as well as simplicity. Though many computer users can communicate with other users by way of the communications infrastructure, these communications occur only if both users are skilled at using the software and hardware devices that bring about the communications functions. Thus, if computer communications software is complex to use, many computer users are dissuaded from making use of these capabilities. This can be especially true when a user enters an unfamiliar network environment or is otherwise unable to connect with his or her usual environment.

One such computer communications technology is centered on establishing networks in which a selected group of users desires to communicate only among members of the group, and does not wish to include members outside the selected group. This technology can be difficult for some users to master, especially when little or no telecommunications infrastructure is present. This is particularly true when ad hoc functions are only required for use on a quick and informal or "ad hoc" basis. Therefore, a method and system for simpler ad hoc networking of computer users is highly desirable.

BRIEF DESCRIPTION OF THE DRAWINGS

FIG. 4 shows a selection screen for initiating an ad hoc network in accordance with a preferred embodiment of the invention.

FIG. 5 shows an ad hoc admissions page used in initiating an ad hoc network in accordance with a preferred embodiment of the invention.

DESCRIPTION OF THE PREFERRED EMBODIMENTS

Figure 1:
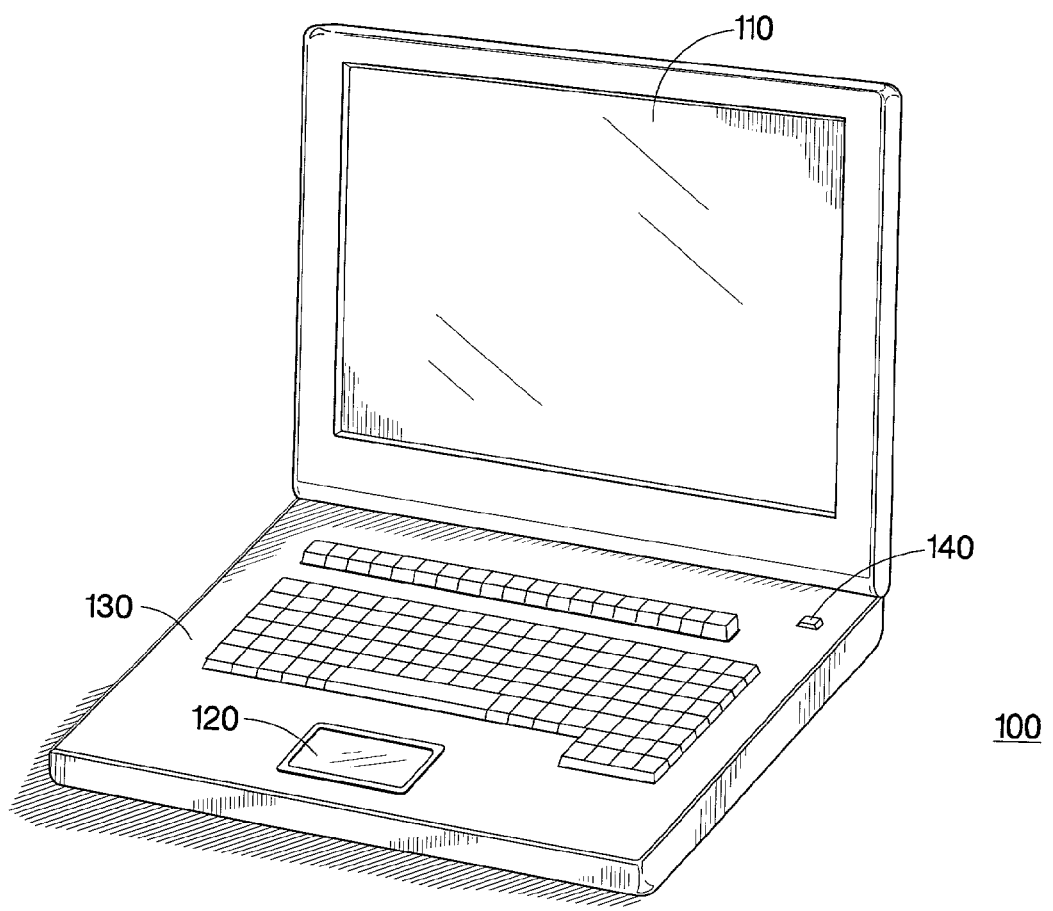
FIG. 1 shows a portable computing device that includes a selector for selecting an ad hoc network function in accordance with a preferred embodiment of the invention.

FIG. 1 shows a portable computing device that includes a selector for selecting an ad hoc network function in accordance with a preferred embodiment of the invention. In FIG. 1, computer 100 includes display 110, touchpad 120, keyboard 130, and ad hoc selector 140. Preferably, a user interacts with keyboard 120, which includes various selectors (e.g. keys) that generate signals that control the placement of symbols on display 110. Ad hoc selector 140, when activated by a user of computer 100, preferably causes the computer to display information that pertains to becoming a member of an ad hoc network. For the purposes of this description, becoming a member of an ad hoc network includes creating a new ad hoc network, or joining an existing ad hoc network. Thus, the activation of ad hoc selector 140 assists the user in creating or initiating an ad hoc network, or assists the user in joining an existing ad hoc network.

Portable computing device 100 can be a portable laptop computer or a notebook computer. Further, portable computing device 100 can be a hand-held personal digital assistant, or other instrument capable of communicating with other computing devices by way of a wireless or wireline connection. Further, ad hoc selector 140 can be a knob, switch, button, or any other device that conveys a user's selection to a processing unit associated with portable computing device 100.

Figure 2:
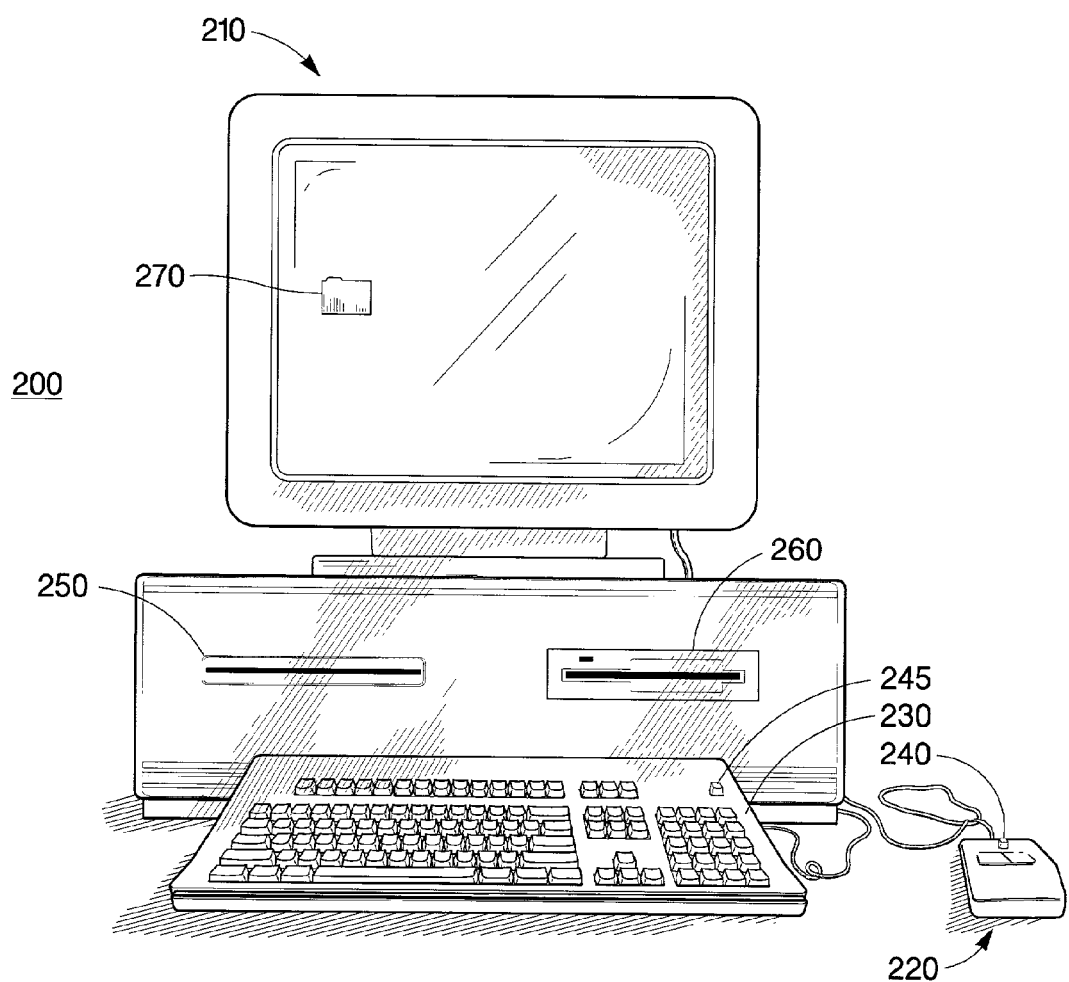
FIG. 2 shows a second computing device that includes a selector for selecting an ad hoc network function in accordance with a preferred embodiment of the invention.

FIG. 2 shows a second computing device that includes a selector for selecting an ad hoc network function in accordance with a preferred embodiment of the invention. In FIG. 2, ad hoc selector 240 has been located on graphical input device 220. Desirably, graphical input device 220 locates and moves a pointer about the surface of display 210 viewable by the user of computer 210. Preferably, the pointer that is moved about the surface of display 210 is either used to position an arrow, in accordance with graphics-based programs executed by computer 200, or can be an I-beam pointer used to position a cursor within text-based programs executed by computer 200. Graphical input device 220 includes at least one selector that allows the user to select and run a program on the desktop displayed on display 210 according to the location of the arrow or I-beam pointer.

Computer 200 of FIG. 2 also includes ad hoc selector 245, which is located nearby keyboard 230. Preferably, when the user depresses ad hoc selector 245, display 210 of computer system 200 displays information that pertains to becoming a member of an ad hoc network. Alternatively, the selection of ad hoc selector 240 on graphical input device 220 can also cause information pertaining to becoming a member of an ad hoc network to be displayed on display 210. Thus, the user of computer 200 is capable of initiating ad hoc network functionality by way of depressing either ad hoc selector 240 or 245. In another alternate embodiment, the functions of selectors 240 and 245 can be performed by one of the selectors on the surface of keyboard 230 or on keyboard 130 of FIG. 1. Further, the selection of ad hoc functionality can be brought about by the user interacting with a viewing screen using a finger or a stylus to make a selection. Computer 200 also includes media drives 250 and 260 which are capable of reading optical, magnetic, or other media that store programs, such as an ad hoc network program that enables computer 200 to execute one or more of methods disclosed herein.

In an alternate embodiment, ad hoc selector 270, shown as an icon on display 210, implements the ad hoc selection function. This allows the user to become a member of an ad hoc network in a manner that accords with the selection of other programs available on the desktop shown on display 210.

Figure 3:
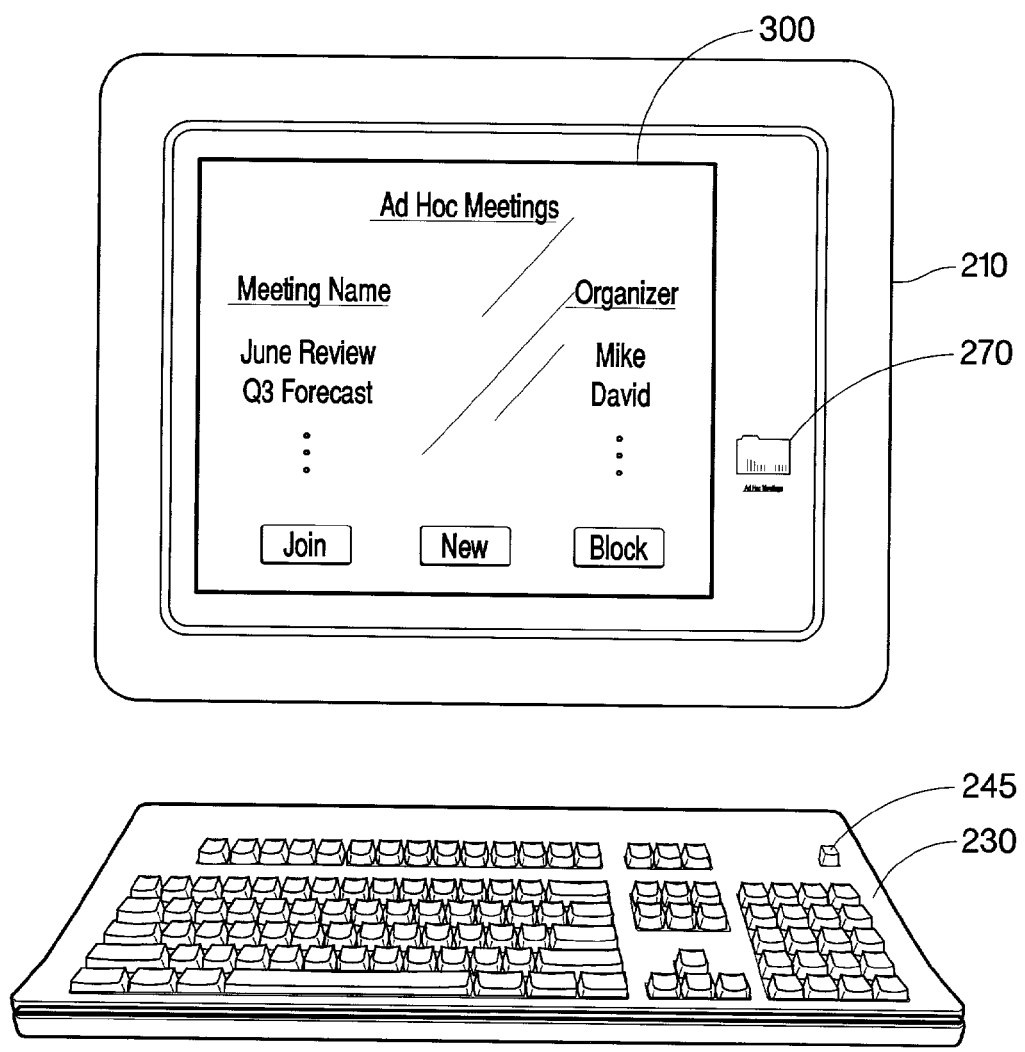
FIG. 3 shows the portable computing device of FIG. 2 displaying a selection screen for selecting an ad hoc network in accordance with a preferred embodiment of the invention.

FIG. 3 shows the portable computing device of FIG. 2 displaying a selection screen for selecting an ad hoc network in accordance with a preferred embodiment of the invention. In FIG. 3, ad hoc network page 300 is displayed in response to the selection of ad hoc selector 245 on the surface of keyboard 230 or in response to the selection of ad hoc selector 240 on the graphical pointing device 220. Desirably, the ad hoc network page includes an appropriate title such as "Ad Hoc Meetings" as shown in FIG. 3. The selection screen further includes provisions for listing at least some parameters that identify a name of an ad hoc meeting currently in progress, such as the meeting name and the host of the meeting.

In FIG. 3, the meeting names displayed by way of ad hoc network page 300 may include only those meetings within wireless communications range of the computer associated with display to 10. However, ad hoc network page 300 can also be tailored to display those meetings established using local area network wireline connections or wide area network connections.

In FIG. 3, ad hoc network page 300 further includes a "join" and a "new" selection. Thus, if the user wishes to select to join an existing meeting, the user may only be required to select a meeting name or a host of the meeting, and then choose the "join" selection. In the event that the user wishes to initiate a new ad hoc meeting, the "new" selection enables this function, which is described in greater detail with reference to FIG. 4.

FIG. 4 shows a selection screen for initiating an ad hoc network in accordance with a preferred embodiment of the invention. In FIG. 4, ad hoc meeting set up page 310 is displayed. Desirably, a "meeting name" field is used to enable the meeting organizer to choose a meeting name that is descriptive, or at least convenient for the organizer as well as other computer users to remember. Thus, a name such as "June review" or "Q3 forecast" are examples of descriptive titles, which can indicate the subject of the ad hoc networking session.

Ad hoc meeting set up page 310 further includes a meeting type identifier. Preferably, these meeting types provide the user with a capability to include only users within wireless communications range. When this type of meeting is desired, the user selects "local" mode. Additionally, when the meeting organizer desires to include users outside of the wireless communications range but within the same building or enterprise, for example, the meeting organizer may select "local area". Further, when the meeting organizer desires to include members beyond a certain range, or perhaps outside the enterprise, the meeting organizer may select "wide area". Preferably, wide area includes users located anywhere within the worldwide telecommunications infrastructure.

Ad hoc meeting set up page 310 preferably also includes a selection that permits the meeting organizer to specify a desired level of security. Thus, for example, when the meeting organizer wishes to share information that is intended for dissemination by the general public, the meeting organizer may select "None". Additionally, in the event that the meeting organizer wishes to specify a low or moderate level of security, the meeting organizer may select "Low". Selection of a low or moderate level of security can be useful when the user wishes to share information that may be disseminated within a business enterprise, for example. The selection of a low or moderate level of security can include the automatic admission to the network of a user based solely on the user's identifying parameters. Thus, a user could be admitted to an ad hoc network based on the user's presentation of an Internet protocol (IP) address or a digital certificate that identifies the user as being part of the enterprise or otherwise possessing appropriate credentials.

In the event that the meeting organizer wishes to specify a higher level of security, the user may select "High". Selection of high security can be useful when the meeting organizer wishes to share information that is disseminated only among selected individuals. In this case, each user may be admitted to the ad hoc network based on the meeting organizer's recognition of each user name or other identifying parameter used in authenticating or verifying the user. The selection of high security could initiate encryption and decryption algorithms that allow sensitive information to be passed among users of the ad hoc network. This can include the use of a password chosen by the meeting organizer and required by each user in order to gain admission to the ad hoc network. When operating in a high security environment, ad hoc network page 300 may include a selector that that precludes participation in an ad hoc session, thus preventing the inadvertent transmission of sensitive data from a user's computer unit.

Ad hoc meeting page 310 preferably includes a capability to recall at least some of the information previously used to organize a meeting of the same name. Thus, for example, in the event that a past networking session entitled "New Product Features" involved only "Local" users with a security level of "None" then future session names having this title would cause ad hoc set up page 310 to assume these attributes. Desirably, however, the meeting organizer is able to change these attributes as required.

Ad hoc meeting page 310 can include a variety of other parameters for use by the meeting organizer. For example, when establishing a meeting in an IEEE 802.11 compatible environment, ad hoc meeting page 310 may display information such as Service Set Identifier (SSID), channel, as well as enabling the meeting organizer to select the complexity of an encryption code (i.e. 40 bit or 128 bit).

FIG. 5 shows an ad hoc admissions page used in initiating an ad hoc network in accordance with a preferred embodiment of the invention. In FIG. 5, which should occur after the user interacts with ad hoc meeting page 310, the meeting organizer is presented with various user names that correspond to users attempting to gain admission to the ad hoc network. Preferably, ad hoc network admissions page 320 is used when the meeting organizer selects a Low or High security level by way of ad hoc meeting page 310 (of FIG. 3). The use of ad hoc network admissions page 320 allows the meeting organizer to select individuals for admission into the ad hoc network. In the case of a high security meeting, each user name, for example, is displayed to the meeting organizer only after the user has entered the correct password on the computer under the user's control.

Figure 6:
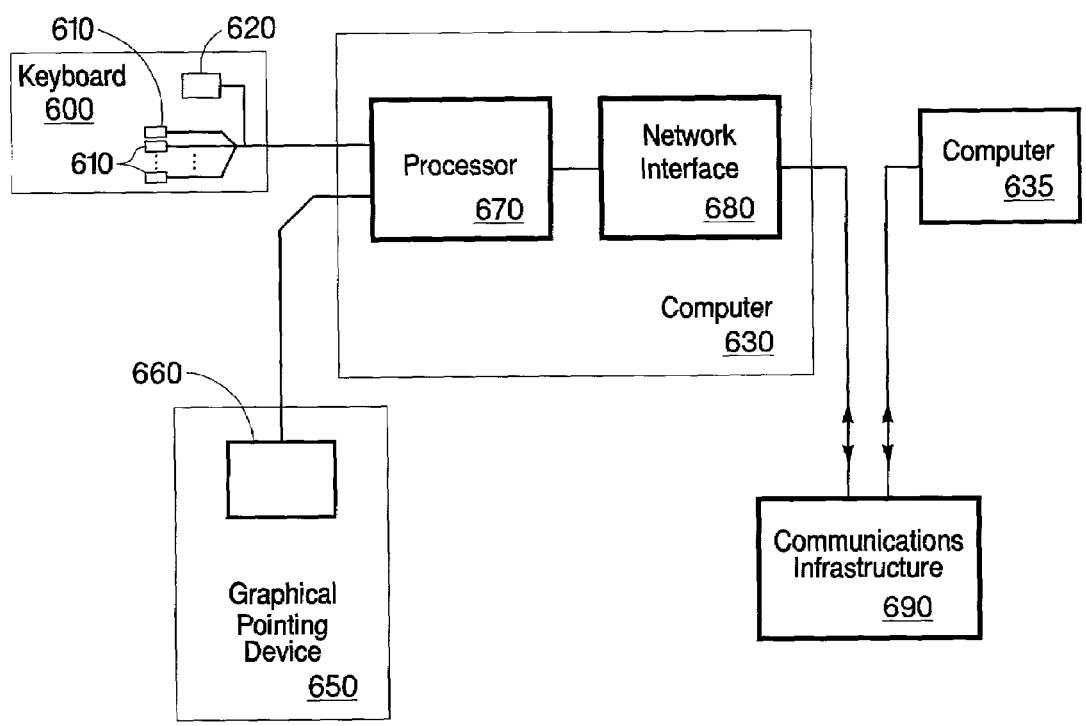
FIG. 6 shows components used in a computer that includes a selector for initiating an ad hoc network in accordance with a preferred embodiment of the invention.

FIG. 6 shows components used in a computer that include a selector for initiating an ad hoc network in accordance with a preferred embodiment of the invention. FIG. 6 includes keyboard 600. Keyboard 600 includes selectors 610 which correspond to alphanumeric keys that enable a user to interact with computer 630. Additionally, selectors 610 may include other types of sensors that convey inputs from a user's hand or finger to computer 630 These sensors may interpret gestures or other movements of the body or limbs that express or emphasize an idea. Further, keyboard 600 may communicate with computer 630 by way of a wireless interface. Keyboard 600 also includes selector 620, which allows a user of computer 630 to become a member of an ac hoc network, either by initiating a new ad hoc session or by joining an on-going ad hoc network.

Alternatively, or in addition to selector 620, graphical pointing device 650 can include a selector (660) for initiating an ad hoc network. In this case, graphical pointing device 650 preferably includes other selectors located on a surface the device that convey information to computer 630, such as the desired location for the placement of a cursor on a computer display associated with computer 630. Additionally, graphical pointing device 650 may communicate with computer 630 by way of a wireless interface.

Inputs from selectors on graphical pointing device 650 and keyboard 600 are presented to processor 670 of computer 630. Processor 670, in turn, generates the necessary displays and accepts additional user inputs that allow the user to become a member of an ad hoc network by way of organizing the ad hoc network, or being admitted to an ad hoc network. Network interface 680 sends and receives network traffic to and from other computers, such as computer 635, by way of communications infrastructure 690 using a wireless protocol such as Bluetooth or IEEE 802.11. Alternatively, network interface 680 may communicate with infrastructure 690 by way of a local area network (LAN) that includes wireline or fiber optic communications interfaces.

In FIG. 6, computer 635 preferably possesses many of the features possessed by computer 630 including interfaces to devices similar to those coupled to computer 630. In the event that computer 635 is within wireless communications range, network interface 680 receives and transmits traffic to computer 635 by way of a wireless link. If needed, processor 670 directs network interface 680 to decouple from communications infrastructure 690 prior to the user selecting to become a member of an ad hoc network. (This decoupling can be useful in the event that the network interface 680 communicates by way of an IEEE 802.11 protocol.)

Figure 7:
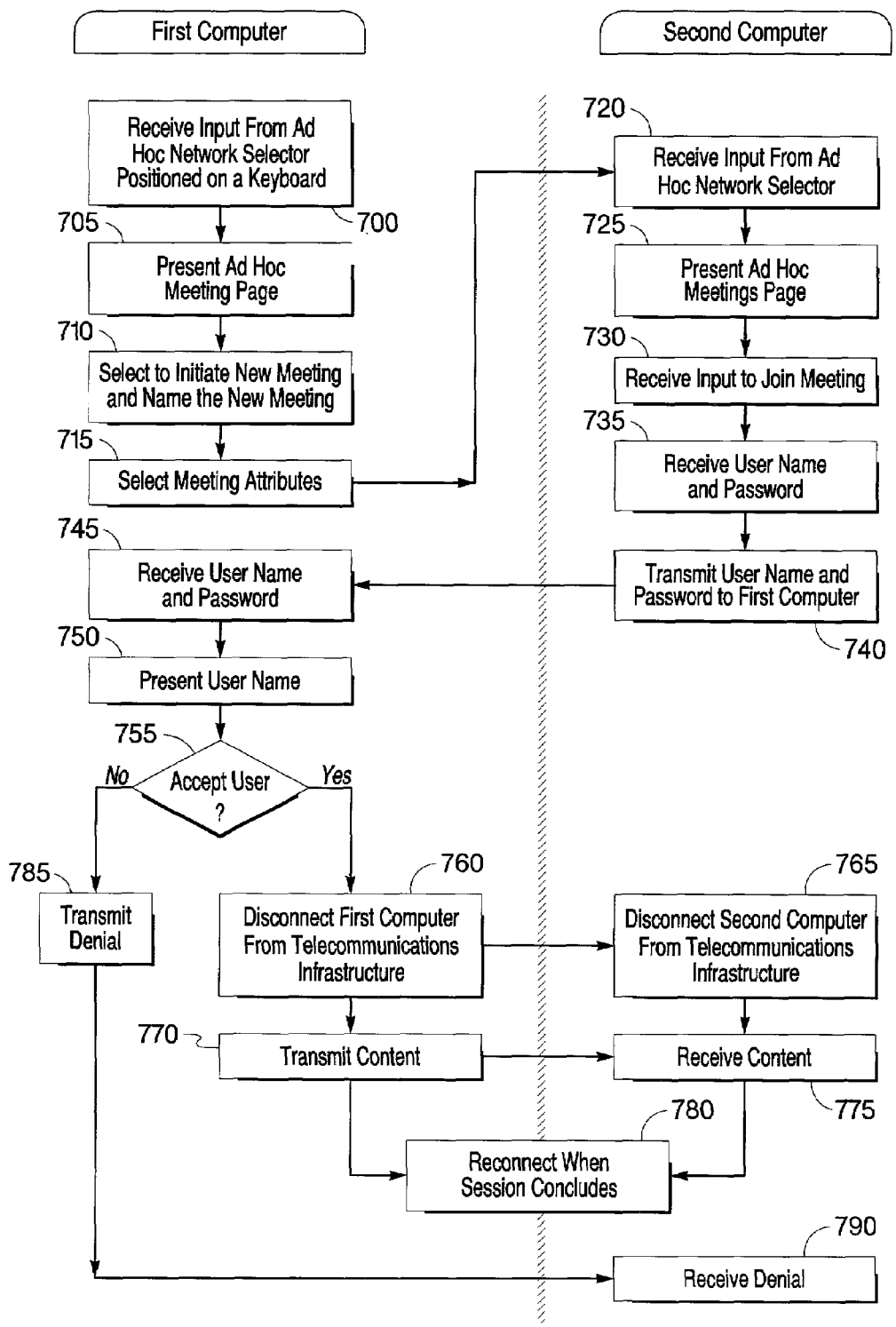
FIG. 7 is a flowchart for a method of communicating by way of an ad hoc network in accordance with a preferred embodiment of the invention.

FIG. 7 is a flowchart for a method of communicating by way of an ad hoc network in accordance with a preferred embodiment of the invention. The method begins at block 700 in which a first computer receives an input from an ad hoc network selector. Preferably, the network selector is positioned on a keyboard connected to the computer. The method continues at block 705 in which the first computer presents an ad hoc meeting page to the user. At block 710 the user of the first computer selects to initiate a new meeting. At block 715, the first computer receives meeting attributes, such as a meeting name, security level (e.g. none, low, and high), and a password by way of the user interacting with the ad hoc meeting page.

At block 720, a second computer receives an input from an ad hoc network selector. Preferably the ad hoc selector is positioned on a keyboard connected to the computer, but can be positioned on a graphical input device or can be represented as a symbol on a computer desktop. At block 725 a display of the second computer presents an ad hoc meeting page to the user of the second computer. At block 730 the second computer receives an indication that the user of the second computer desires to join the ad hoc meeting. At optional block 740, the user of the second computer enters a password that preferably corresponds to a password selected by the first computer user in block 720. In the event that the user of the first computer has not selected a level of security that warrants the use of a password then block 740 is not executed and the method continues at block 745. At block 745 the first computer receives the name or other identifier of the user of the second computer as well as any password information entered by the user of the second computer. At block 750 the name of the user of second computer is presented to the user of the first computer by way of a computer display. At block 755 the user of the first computer either accepts or rejects the user of the second computer based on the verification of block 745.

If the user of the first computer has accepted the user of the second computer, block 760 is executed in which the first computer is decoupled from the wireless (or wireline) telecommunications infrastructure. Desirably, the second computer also decouples from the telecommunications infrastructure in block 765. Blocks 760 and 765 may be needed only when operating in a wireless communications environment such as IEEE 802.11. Thus, these blocks may be skipped when operating in other wireless communications environments.

The method continues at block 770 in which the first computer transmits content to the second computer. The second computer receives the transmitted content in block 775. At the conclusion of the ad hoc meeting, block 780 is executed in which the second computer is recoupled to the telecommunications infrastructure. This block may optional depending on whether blocks 760 and 765 have been executed.

In the event that the user of the first computer rejects the user of the second computer (in block 755) block 785 is performed, in which a message is presented to the user of the second computer that indicates the denied admission to the ad hoc network. The second computer displays the received indication in block 790.

Figure 8:
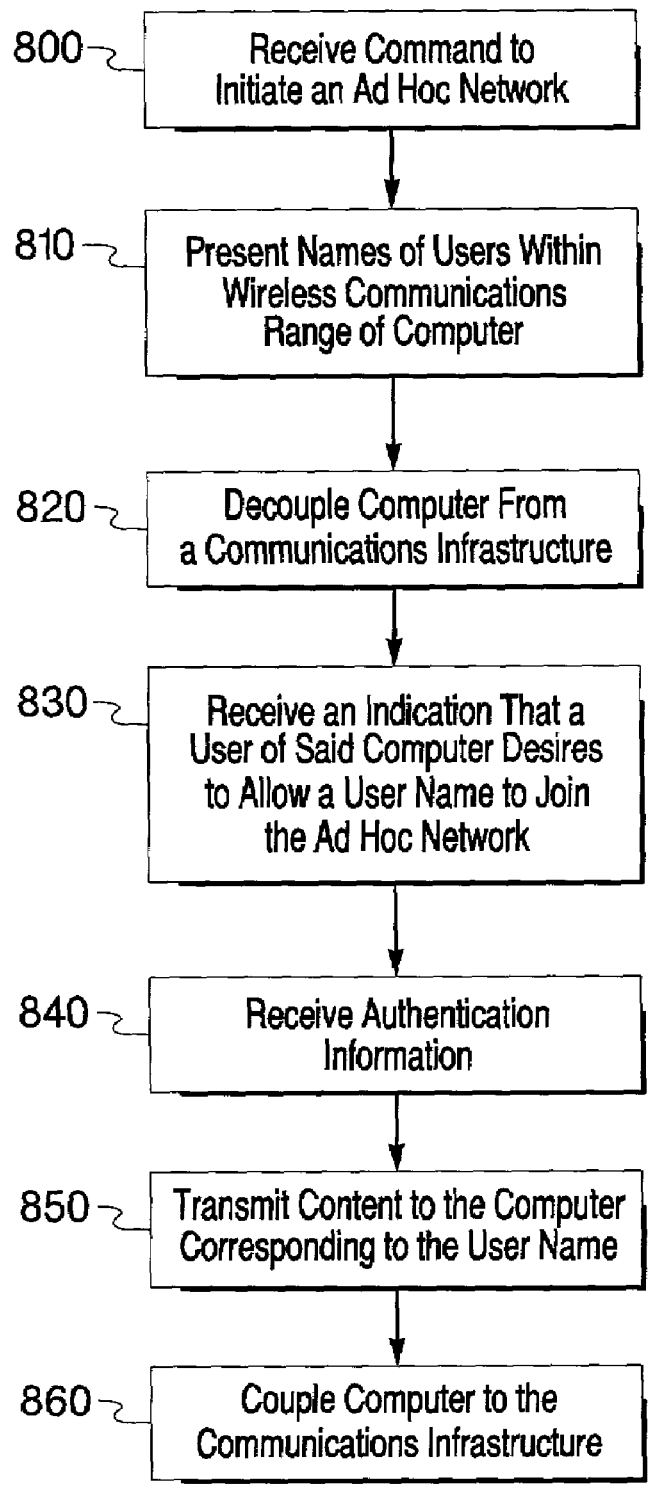
FIG. 8 is a flowchart for a method used by a computer to initiate an ad hoc network in accordance with a preferred embodiment of the invention.

FIG. 8 is a flowchart for a method used by a computer to initiate an ad hoc network in accordance with a preferred embodiment of the invention. The method of FIG. 8 can be practiced within computer 100 (FIG. 1), computer 200 (FIG. 2), or computer 630 (FIG. 6), herein. The method begins at block 800 in which a command to initiate an ad hoc network is received. Preferably, this command is received from a user interacting with a keyboard, graphical input device, or selecting an icon on a desktop display. As a result of the selection, an input is conveyed to the computer that informs the computer of the user's desire to participate in an ad hoc network. In response to the command, block 810 is performed in which the computer presents a list of user names that correspond to users within wireless communications range of the computer.

At block 820, the computer is decoupled from a communications infrastructure (if needed). As previously mentioned herein, this decoupling may be desirable in certain wireless environments, such as an IEEE 802.11 compatible network, so that the initiating computer can become a network master for the other members of the ad hoc network. In this case, the decoupling mitigates contention issues with network masters from the telecommunications infrastructure.

The method continues at block 830 in which a user name corresponding to a user attempting to gain access to the ad hoc network is received by the initiating computer. At optional block 840, the initiating computer receives authentication information from the user attempting to gain access to the ad hoc network in block 830. This authentication information is received if the user of the originating computer has selected that a level of security be imposed on the session.

At block 850, content is transmitted from the initiating computer. Preferably, block 850 is performed as part of the initiating computer accepting a user to the ad hoc network. The method concludes at block 860, in which the initiating computer is decoupled from the ad hoc network and recoupled to the communications infrastructure. Block 860 may only be required if block 820 has been performed in which the initiating is decoupled from an existing wireless infrastructure. Preferably, block 860 is performed after the conclusion of the ad hoc network session.

Figure 9:
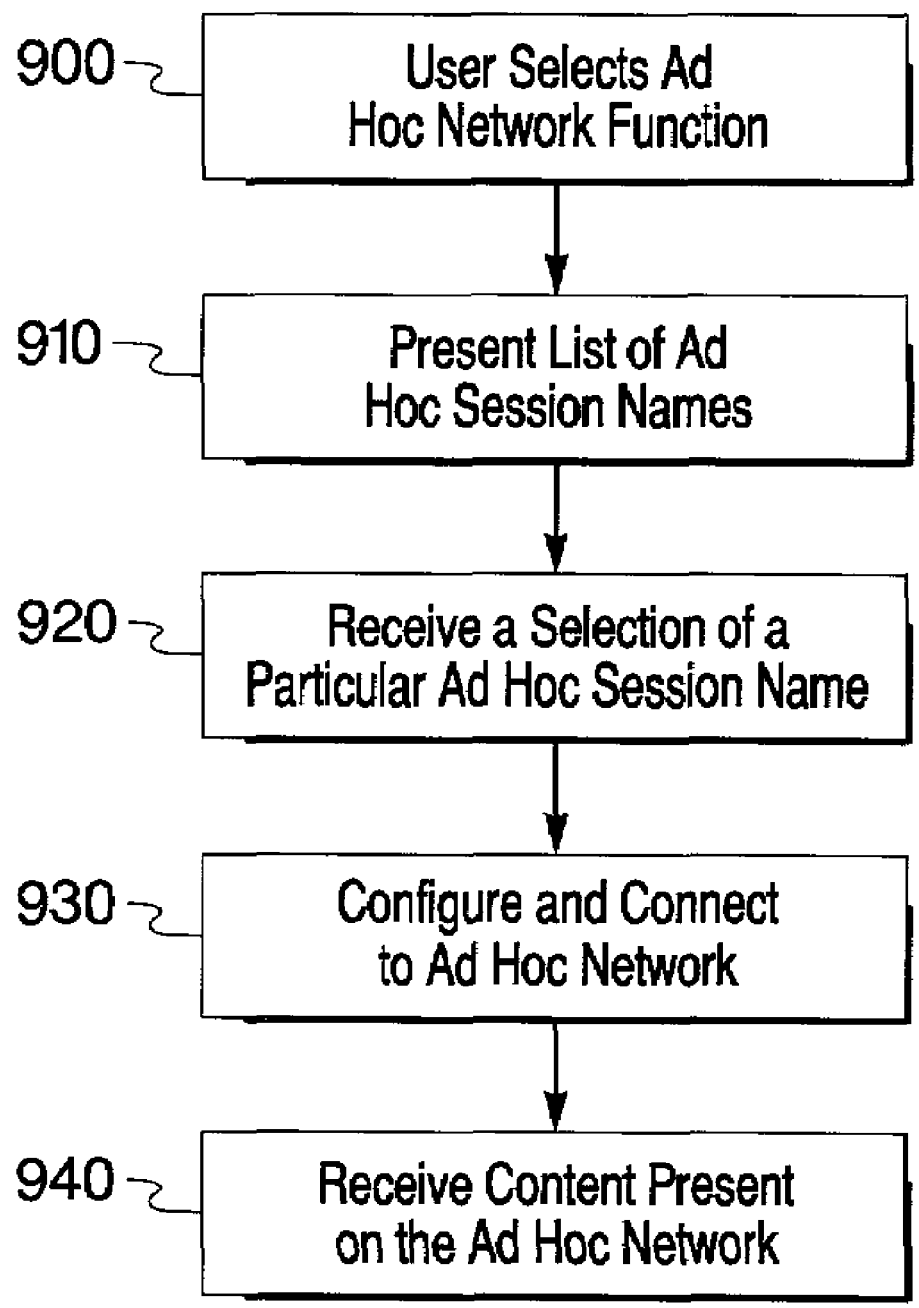
FIG. 9 is a flowchart for a method of receiving content by a computer used in an ad hoc network in accordance with a preferred embodiment of the invention.

FIG. 9 is a flowchart for a method of receiving content by a computer used in an ad hoc network in accordance with a preferred embodiment of the invention. The method of FIG. 9 can be practiced within either computer 100 (of FIG. 1), computer 200 (of FIG. 2), or computer 635 (of FIG. 6) when the computer has been selected to join an existing ad hoc meeting. At block 900, a user selects an ad hoc network function. Preferably, this selection is made by the user interacting with a button on a computer keyboard, graphical input device, or by way of the user selecting an icon or other symbol on a display of the computer. The method continues at block 910 where a list of ad hoc meeting names is presented to the user. At block 920, the computer receives the selection of the ad hoc meeting name selected from the list of meeting names presented in block 910. The method continues at block 930 in which the computer is configured to connect to the selected ad hoc network by way of inheriting parameters previously used with the chosen ad hoc selection name. At block 940, the computer receives content presented by way of the selected ad hoc network.

Figure 10:
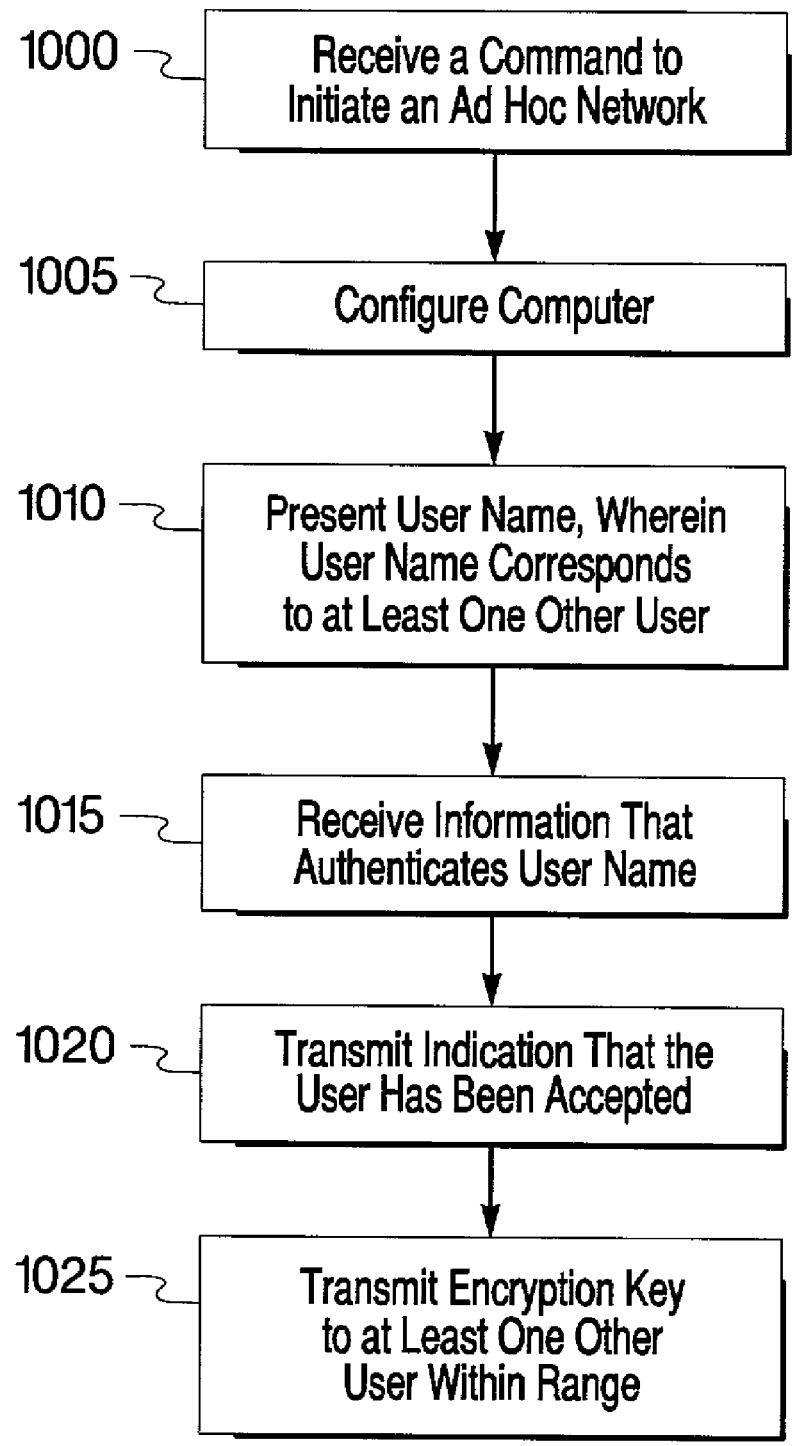
FIG. 10 is a flowchart for a method used within a first computer for initiating an ad hoc network in accordance with a preferred embodiment of the invention.

FIG. 10 is a flowchart for a method used within a first computer for initiating an ad hoc network in accordance with a preferred embodiment of the invention. The method of FIG. 10 can be encoded on one or more computer readable media having computer readable instructions thereon which, when executed by the first computer, cause the computer to perform the method. The method begins at block 1000 in which a command to initiate an ad hoc network is received by the first computer. Preferably, the command is received from an input conveyed to the first computer by an input device such as a keyboard, mouse, or by way of the selection of an icon on a display controlled by the first computer. The method continues at block 1005 in which the computer is configured to initiate an ad hoc network. This configuration may include the first computer receiving a session name, security level, password, and other parameters chosen for the session. These parameters are entered by a way of a user interacting with an input device coupled to the first computer.

At block 1010 a user name that desirably corresponds to another user in the ad hoc network is presented on a display coupled to the first computer. This block results from a second user, operating a second computer, seeking to join the ad hoc session. The method continues at block 1015 in which the first computer receives information that authenticates the user of the second computer. This block can include the first computer receiving a correct password from the second computer, or can include the reception of other information that confirms the identity of the user of the second computer.

At block 1020, the second user receives an indication that the meeting initiator, operating the first computer, has accepted the user name. Preferably, this permits the second user to enter the ad hoc network. At block 1025, the first computer transmits an encryption key to the second user. Also at block 1025, content is transmitted to at least one other user within wireless communications range. This content may be encrypted in accordance with the selection of a security level by the initiator of the ad hoc network (as in block 1005).

Figure 11:
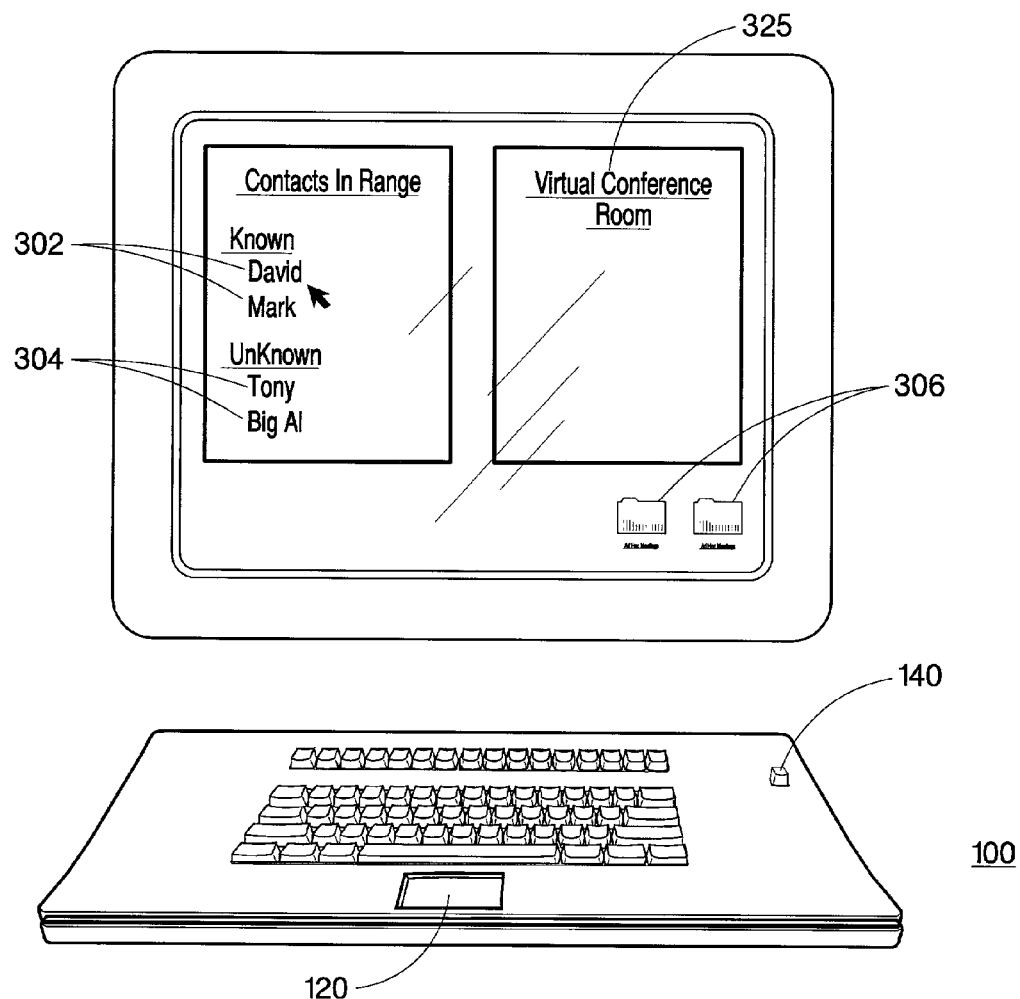
FIG. 11 represents a computing device displaying ad hoc network pages in accordance with an alternate embodiment of the invention.

FIG. 11 represents a computing device displaying ad hoc network pages in accordance with an alternate embodiment of the invention. In FIG. 11, a meeting organizer actuates an ad hoc selector (140) so that display pages 315 and 325 are displayed. Preferably, display page 315 includes all or at least a substantial number of individual computing devices capable of wireless communications within local (i.e. point-to-point) wireless communications range of portable computing device 100. Display page 315 includes usernames 302 that correspond to users that have been included in a previous ad hoc session or are otherwise identified as being "known" to the user of computing device 100. Display page 315 preferably also displays a list of usernames (304) that correspond to users that are within wireless communications range but have not previously been included in an ad hoc meeting. These usernames are designated as being "unknown".

Page 325 is preferably also displayed on the display of computing device 100 when ad hoc selector 140 is actuated. Page 325 represents a virtual meeting place where computer files and other resources, such as those represented by icons 306, can be shared among multiple users. Thus, the user of computing device 100 need only drag user names to a location within the boundaries of virtual meeting place (325) in order to enable these usernames to participate in an ad hoc session. When the user of device 100 has identified the usernames desired for participation in the ad hoc session, the user may drag one or more of icons 306 so that the designated usernames can have access to the files represented by icons 306.

In a preferred form of this embodiment, computing device 100 transmits a message to the computing devices associated with each of the designated usernames so that the corresponding users can be notified of the meeting host's desire for an ad hoc session. In response to the received messages, the receiving computing devices can present a page to each user to notify the users of the initiation of an ad hoc meeting. Alternatively, as a result of receiving the message, the receiving computing device can illuminate an ad hoc selector (which can be similar to ad hoc selector 140) or cause the selector to blink in a manner that attracts the attention of the user of the device. In addition to, or in place of the illumination of ad hoc selector 140, an icon located on the display of the user's computer can indicate that an ad hoc meeting is being organized and that the user is invited to join the meeting. The user can then select to join the ad hoc meeting by actuating ad hoc selector 140 or by selecting an icon on the user's computer display.

In another embodiment, page 315 is presented in the form of a document displayed by way of a word processing program in which each user name represents an object linked to ad hoc network information about the person. This allows the meeting organizer to select and drag a username into the virtual meeting place 325. As the username is dragged into the virtual meeting place, computing device 100 desirably transmits a message to the computing device associated with the username and so that the user can be invited to join the ad hoc session.

In yet another embodiment, usernames 302 can be linked to ad hoc network parameters. Thus, by selecting one of usernames 302, computing device 100 desirably transmits a message to the computing device associated with the username so that the particular user can be invited to join the ad hoc session. Usernames 302, and the associated ad hoc links to the computing devices that correspond to each username, can be embedded in a variety of documents presented to the user of computing device 100. Therefore, the "Contacts in Range" page of FIG. 11 can be replaced by a document, such as meeting minutes from a previous meeting, distribution lists, reports, electronic mail messages, spread sheets, and other material. This allows the user of computing device 100 to invite another user to an ad hoc session simply by selecting the username of the other user in a document displayed on the display of computer 100.

Figure 12:
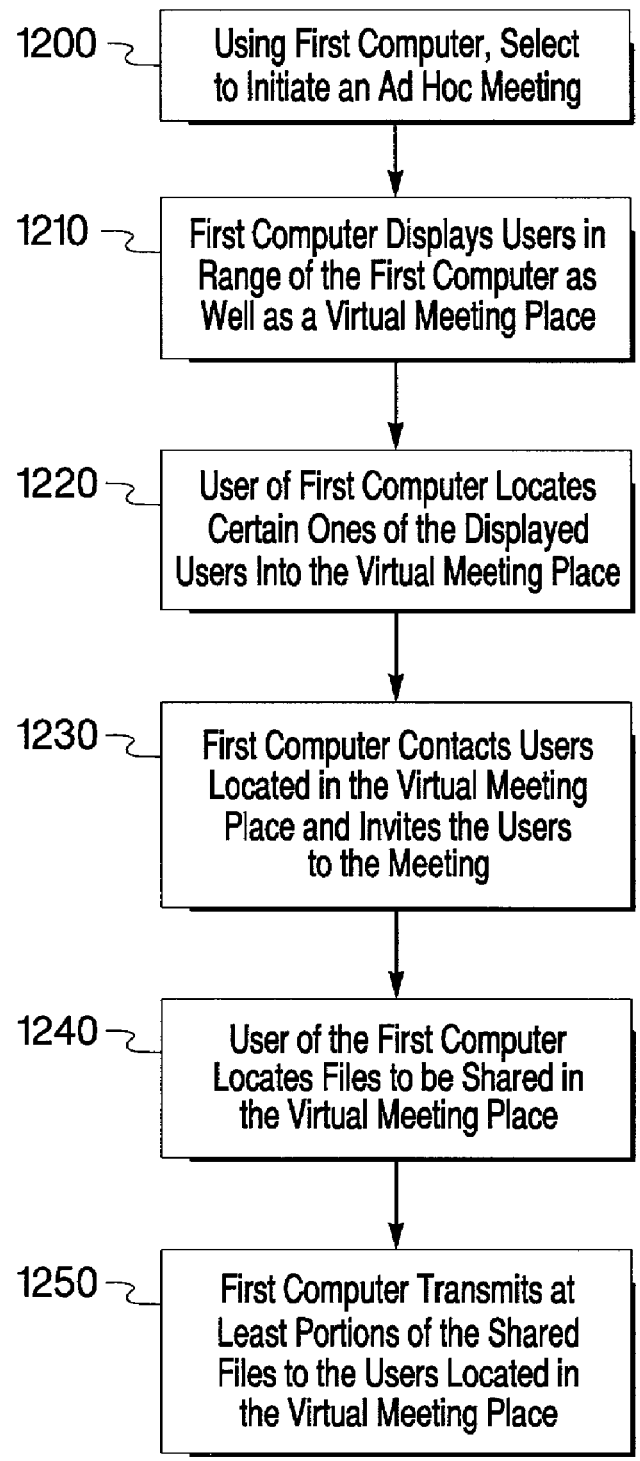
FIG. 12 is a flowchart of a method for initiating an ad hoc meeting in accordance with the embodiment of FIG. 11.

FIG. 12 is a flowchart of a method for initiating an ad hoc meeting in accordance with the embodiment of FIG. 11. The method of FIG. 12 begins at block 1200, in which a user selects to initiate an ad hoc meeting using a first computer. In block 1210, the first computer displays users within point-to-point wireless communications range as well as presenting a graphical representation of a virtual meeting place, such as the virtual conference room of FIG. 11.

At block 1220, the user of the first computer drags or otherwise relocates certain ones of the displayed user names into the virtual meeting place. At block 1230, the first computer contacts at least one of the users located in the virtual meeting place and invites users to the ad hoc session. Desirably, the first computer contacts each of the users corresponding to the usernames located in the virtual meeting place by way of a wireless communications link that uses the parameters selected to communicate with the user during a previous session. Alternatively, a default set of parameters can be used to communicate with users where no predetermined communications parameters are defined.

At block 1240, the user of the first computer selects and drags or otherwise relocates files into the virtual meeting place. By placing these files into the virtual meeting place, the user of the first computer identifies these files as being a resource that can be shared with the users in the virtual meeting place. The method continues at block 1250 in which the first computer transmits at least portions of the files located in the virtual meeting place to the other ad hoc meeting participants.

What is claimed is:

1. An input device comprising:
a first selector that generates a signal that controls placement of a symbol on a computer display, said computer display being coupled to a computer that receives said signal from said first selector;
a second selector that causes said computer to display information that pertains to becoming a member of an ad hoc network, wherein
the second selector is located on the surface of the input device,
wherein depressing the second selector causes said computer to display a selection screen for selecting an ad hoc network; and
an encryption key generated by an initial user of the ad hoc network, wherein encrypted content and the encryption key for decrypting the encrypted content is transmitted to at least one other user within wireless communications range of the initial user, wherein the content is encrypted in accordance with a security level determined by the initial user.

2. The input device of claim 1, wherein said input device is a computer keyboard and wherein said second selector is a button located on said computer keyboard.

3. The input device of claim 2, wherein said symbol is an alphanumeric character generated by said first selector.

4. The input device of claim 2, wherein said computer keyboard communicates with said computer by way of a wireless interface.

5. The input device of claim 1, wherein said input device is a graphical input device and wherein said second selector is a button located on said graphical input device.

6. The input device of claim 5, wherein said symbol is one of an arrow and an I-beam pointer.

7. The input device of claim 5, wherein said graphical input device communicates with said computer by way of a wireless interface.

8. In a computer, a method for initiating an ad hoc network, comprising:
receiving a command to initiate said ad hoc network, said command originating from an input selector located on the surface of an input device, and wherein depressing the input selector causes said computer to display a selection screen for selecting an ad hoc network;
presenting a list of usernames that correspond to other users within wireless communications range of said computer;
transmitting content to at least some of said other users within said wireless communications range; and
generating an encryption key by an initial user of the ad hoc network, wherein encrypted content and the encryption key for decrypting the encrypted content is transmitted to at least one other user within wireless communications range of the initial user, wherein the content is encrypted in accordance with a security level determined by the initial user.

9. The method of claim 8, wherein said input device is a keyboard connected to said computer.

10. The method of claim 8, wherein said input device is a graphical input device that controls the placement of an arrow on a display associated with said computer.

11. The method of claim 8, additionally comprising decoupling said computer from a wireless communications infrastructure.

12. The method of claim 8, additionally comprising receiving an indication that a user of said computer desires to allow a certain one of said usernames to join said ad hoc network, said indication being conveyed to said computer by said input device.

13. The method of claim 8, additionally comprising receiving authentication information from at least one of said users within wireless communications range of said computer.

14. The method of claim 8, wherein said presenting action includes presenting a document that includes said list of said usernames, and wherein selecting at least one username of said list of usernames causes said computer to transmit a meeting invitation to said at least one username.

15. The method of claim 14, wherein said document is one of the group consisting of a distribution list, a report, an electronic mail message, and a spread sheet.

16. A computer that establishes an ad hoc network, comprising:

a keyboard having a selector that generates a signal which indicates that a user has selected an ad hoc networking function, wherein the second selector is located on the surface of the input device, and wherein depressing the second selector causes said computer to display a selection screen for selecting an ad hoc network;

a processor, coupled to said keyboard, which receives said signal and initiates an ad hoc network function;

a network interface, coupled to said processor, for communicating directly with at least one other computer within wireless communications range of said first computer; and an encryption key generated by an initial user of the ad hoc network, wherein encrypted content and the encryption key for decrypting the encrypted content is transmitted to at least one other user within wireless communications range of the initial user, wherein the content is encrypted in accordance with a security level determined by the initial user.

17. The computer of claim 16, wherein said selector is a button that is depressed by said user when said user selects said ad hoc function.

18. The computer of claim 16, wherein said network interface transmits and receives information in accordance with an 802.11 protocol.

19. The computer of claim 18, wherein said processor additionally directs said network interface to decouple from a communications infrastructure in response to receiving said signal.

20. The computer of claim 16, wherein said network interface transmits and receives information in accordance with a Bluetooth protocol.

21. The computer of claim 16, wherein said network interface additionally receives at least one identifier that corresponds to said at least one other computer within wireless communications range said computer that establishes said ad hoc network.

22. A method of receiving content in an ad hoc network, comprising:

selecting, by a user, an ad hoc network function, said selection being made by way of an ad hoc selector on a surface of a keyboard coupled to a computer, wherein depressing the ad hoc selector causes said computer to display a selection screen for selecting an ad hoc network;

said computer configuring itself to connect with said ad hoc network;

said computer receiving content present on said ad hoc network; and generating an encryption key by an initial user of the ad hoc network, wherein encrypted content and the encryption key for decrypting the encrypted content is transmitted to at least one other user within wireless communications range of the initial user, wherein the content is encrypted in accordance with a security level determined by the initial user.

23. The method of claim 22, wherein said computer configures itself according to settings used to conduct a previous ad hoc meeting.

24. The method of claim 22, additionally comprising said computer presenting a list of previous ad hoc network session names to said user, said presenting occurring prior to said configuring.

25. The method of claim 24, additionally comprising said computer receiving a session name selected by a user from said list of previous ad hoc session names.

26. The method of claim 22, wherein said ad hoc network operates over a local area network using a wireline interface.

27. The method of claim 22, wherein said ad hoc network operates over a wide area network.

28. A method for communicating by way of an ad hoc network, comprising:

a first computer receiving an input from an ad hoc network selector positioned on a surface of a keyboard connected to said first computer, wherein depressing the ad hoc network selector causes said computer to display a selection screen for selecting an ad hoc network;

a second computer receiving an indication that said first computer has initiated an ad hoc network;

said second computer receiving an input from an ad hoc selector positioned on a keyboard connected to said second computer; and an encryption key generated by an initial user of the ad hoc network, wherein encrypted content and the encryption key for decrypting the encrypted content is transmitted to at least one other user within wireless communications range of the initial user, wherein the content is encrypted in accordance with a security level determined by the initial user.

29. The method of claim 28, additionally comprising said second computer transmitting a username to said first computer.

30. The method of claim 29, additionally comprising said second computer transmitting authentication information to said first computer.

31. The method of claim 30, additionally comprising said first computer verifying the authenticity of said authentication information.

32. The method of claim 28, additionally comprising said second computer receiving content from said first computer.

33. The method of claim 28, additionally comprising at least one of said first and said second computers decoupling from a communications infrastructure.

34. The method of claim 28, additionally comprising said second computer illuminating said ad hoc selector, said illuminating occurring in response to said second computer receiving said indication from said first computer.

35. The method of claim 28, additionally comprising said second computer causing an icon on a display associated with said second computer to blink in response to said second computer receiving said indication.

36. One or more computer-readable media having computer-readable instructions thereon which, when executed by a computer, cause the computer to perform a method comprising:

receiving a command to initiate an ad hoc network, said command originating from an input conveyed to said computer by a selector located on a keyboard in response to a selection made by a user of said computer, wherein depressing the selector causes said computer to display a selection screen for selecting an ad hoc network;

configuring said computer to initiate an ad hoc network;

transmitting content to at least one other user within wireless communications range of said computer; and generating an encryption key by an initial user of the ad hoc network, wherein encrypted content and the encryption key for decrypting the encrypted content is transmitted to at least one other user within wireless communications range of the initial user, wherein the content is encrypted in accordance with a security level determined by the initial user.

37. The computer-readable media of claim 36, wherein the computer-readable instructions, when executed by a computer, cause the computer to execute the additional action of presenting a username to said user of said computer, said username corresponding to said at least one other user.

38. The computer-readable media of claim 37, wherein selecting said usename causes said computer to transmit a meeting invitation to a computer that associated with said username.

39. The computer-readable media of claim 38, wherein said username is presented by way of a document presented to said user of said computer.

40. The computer-readable media of claim 39, wherein said document is one of the group consisting of a distribution list, a report, an electronic mail message, and a spread sheet.

41. The computer-readable media of claim 36, wherein the computer-readable instructions, when executed by a computer, cause the computer to execute the additional action of receiving an indication that said user of said computer has accepted said at least one other user to become a member of said ad hoc network.

42. The computer-readable media of claim 36, wherein the computer-readable instructions, when executed by a computer, cause the computer to execute the additional action of receiving information that authenticates said at least one other user.

43. The computer-readable media of claim 36, wherein the computer-readable instructions, when executed by a computer, cause the computer to execute the additional action of transmitting an encryption key to said at least one other user.

44. The computer-readable media of claim 36, wherein the computer-readable instructions, when executed by a computer, cause the computer to execute the additional action of transmitting encrypted information to said at least one other user.

45. The computer-readable media of claim 36, wherein the computer-readable instructions, when executed by a computer, cause the computer to execute the additional action of presenting a virtual meeting place on the display of said computer.

46. The computer-readable media of claim 45, wherein the computer-readable instructions, when executed by a computer, cause the computer to execute the additional action of locating said at least one other user to said virtual meeting place and transmitting an invitation to said at least one other user located in said virtual meeting place.

* * * * *

UNITED STATES PATENT AND TRADEMARK OFFICE
CERTIFICATE OF CORRECTION

PATENT NO.        : 7,120,667 B2
APPLICATION NO.   : 10/021190
DATED             : October 10, 2006
INVENTOR(S)       : Michael D Derocher et al.

It is certified that error appears in the above-identified patent and that said Letters Patent is hereby corrected as shown below:

In column 10, line 29, in Claim 8, delete "usemames" and insert -- usernames --, therefor.

In column 10, line 60, in Claim 14, delete "usemames" and insert -- usernames --, therefor.

In column 10, line 62, in Claim 14, delete "usemame" and insert -- username --, therefor.

In column 11, line 36, in Claim 21, after "range" insert -- of --.

In column 13, line 8, in Claim 38, delete "usename" and insert -- username --, therefor.

Signed and Sealed this

Third Day of March, 2009

JOHN DOLL
*Acting Director of the United States Patent and Trademark Office*